D. H. BRAND.
WHEELBARROW.
APPLICATION FILED FEB. 12, 1912.
1,063,112.
Patented May 27, 1913.
3 SHEETS—SHEET 1.
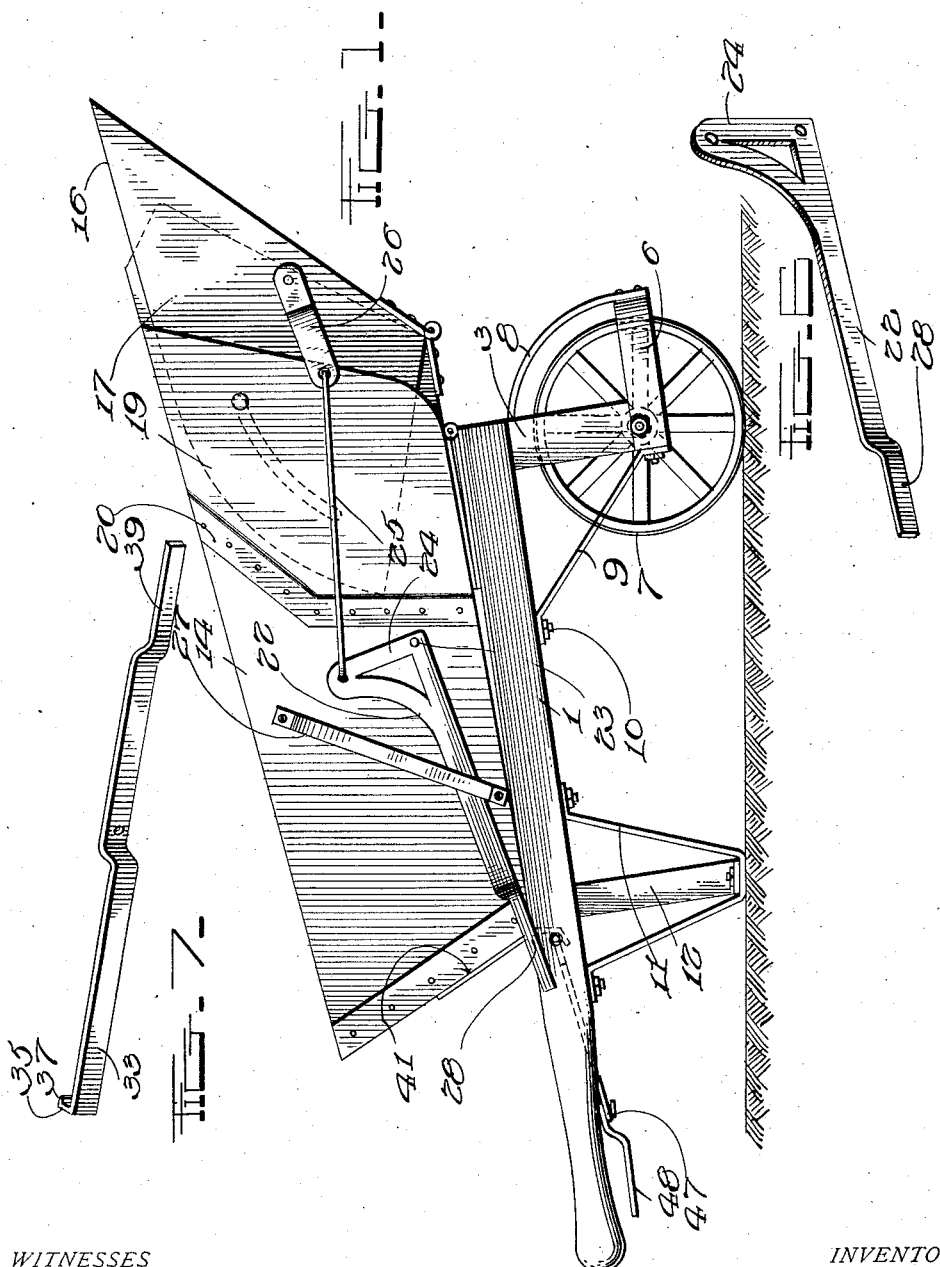
WITNESSES
INVENTOR
David H. Brand
By E. E. Vrooman, his Attorney

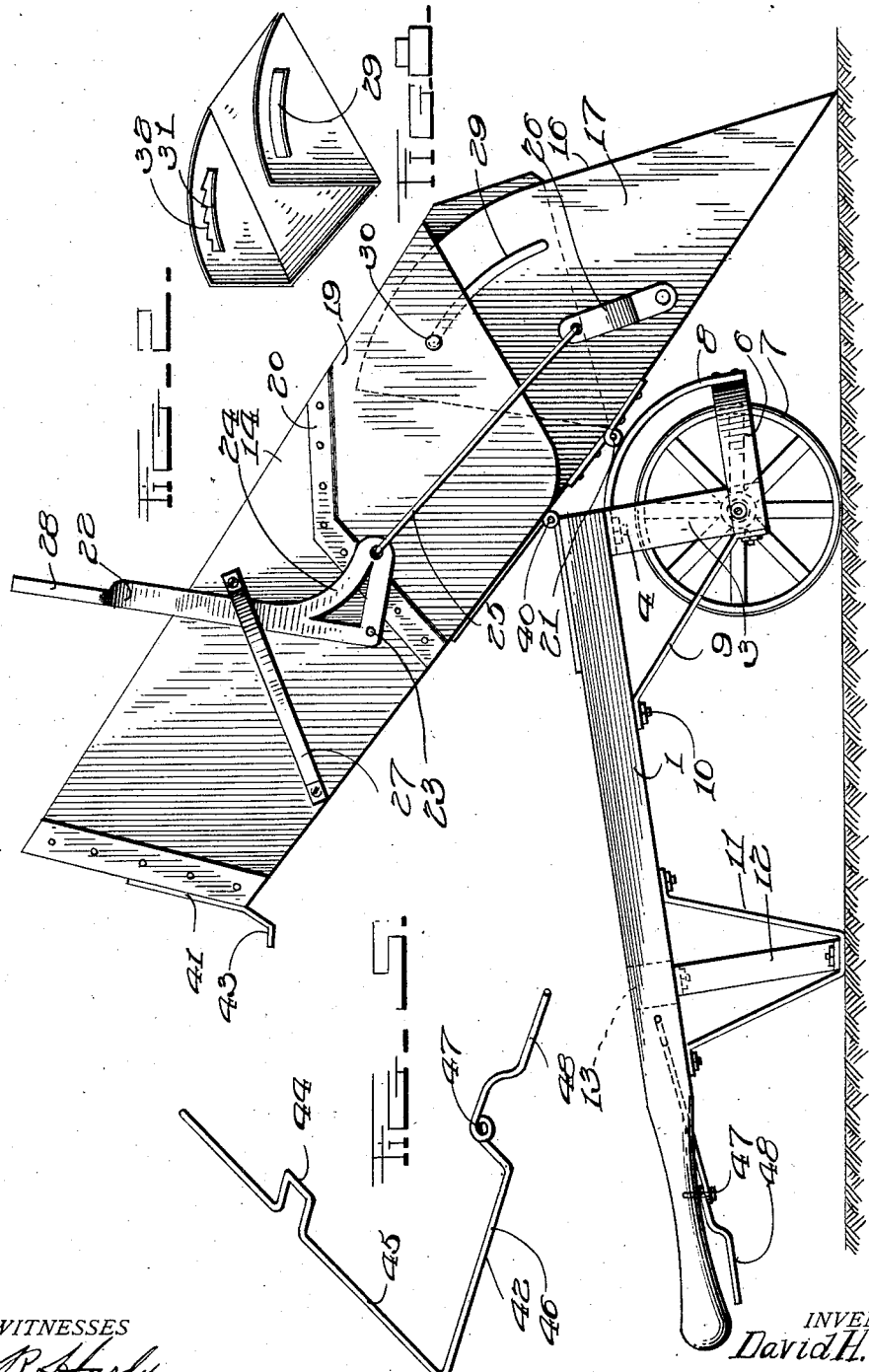

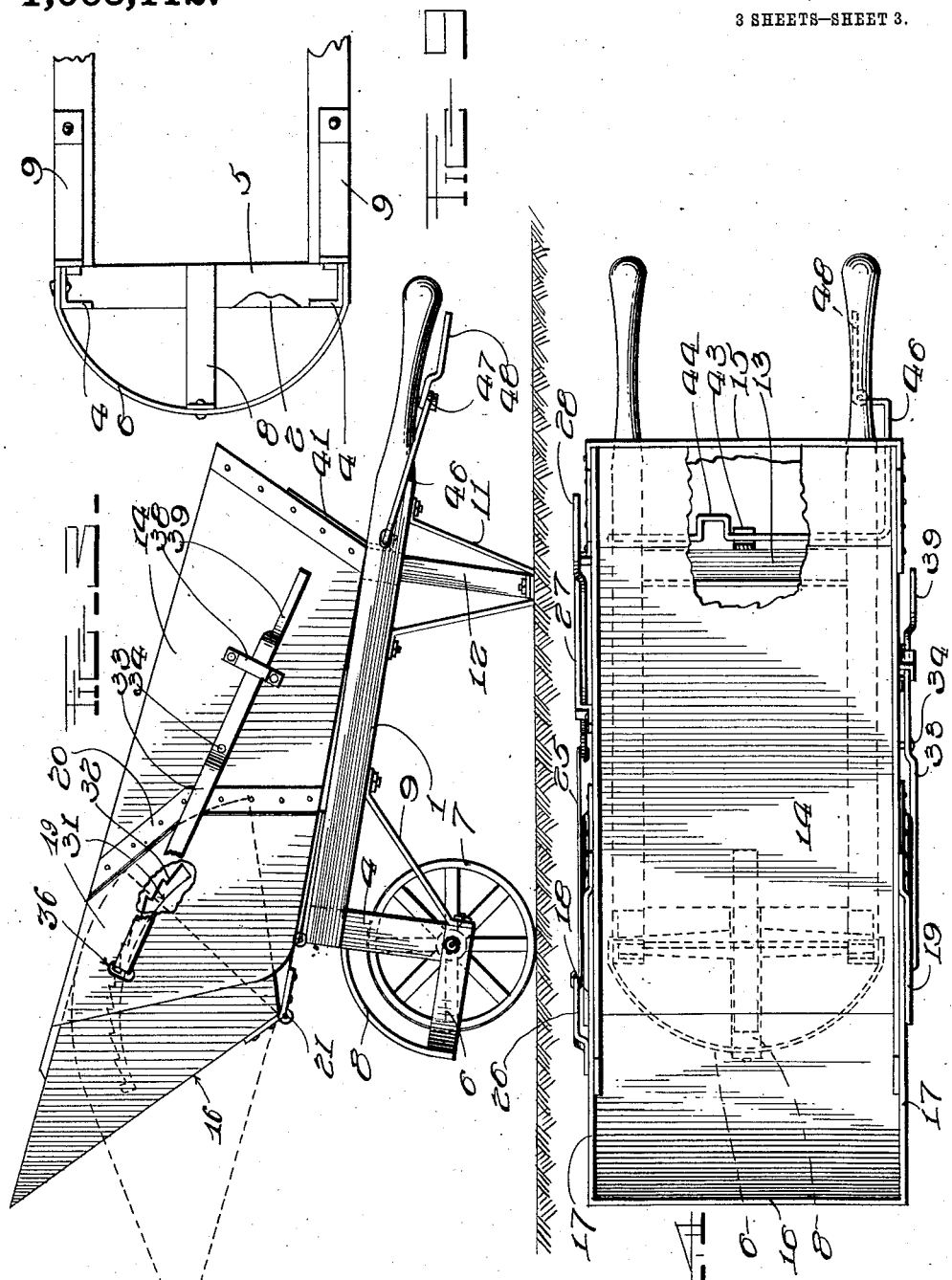

UNITED STATES PATENT OFFICE.

DAVID H. BRAND, OF TRENTON, NEW JERSEY.

WHEELBARROW.

1,063,112.  Specification of Letters Patent.  Patented May 27, 1913.

Application filed February 12, 1912. Serial No. 677,187.

*To all whom it may concern:*

Be it known that I, DAVID H. BRAND, a citizen of the United States, residing at Trenton, in the county of Mercer and State of New Jersey, have invented certain new and useful Improvements in Wheelbarrows, of which the following is a specification, reference being had therein to the accompanying drawing.

This invention relates to wheel barrows and has for its object the production of an efficient dumping means for wheel barrows which may be readily and conveniently operated from the handles thereof.

Another object of this invention is the production of an efficient controlling means for the front end of the wheel barrow whereby the front end may be dumped or tilted independently of the body of the wheel barrow.

With the above and other objects in view, this invention consists in general of certain novel constructions, arrangements and combinations of parts, as will be hereinafter fully described, illustrated in the accompanying drawings, and specifically claimed.

In the accompanying drawings, like characters of reference indicate like parts in the several views, and Figure 1 is a side elevation of the wheel barrow in its normal position. Fig. 2 is a side elevation of the wheel barrow when dumped. Fig. 3 is a side elevation of the wheel barrow taken from the opposite side of that shown in Fig. 1. Fig. 4 is a top plan view of the wheel barrow. Fig. 5 is a detail perspective of the dump control lever. Fig. 6 is a detail perspective of the lever for controlling the tilting of the front end of the wheel barrow. Fig. 7 is a detail perspective of the locking lever for holding the front end of the wheel barrow in a locked position. Fig. 8 is a detail perspective of the hinged front end of the wheel barrow. Fig. 9 is a bottom plan view of the wheel barrow supporting frame showing the construction of the wheel fender.

Referring to the drawings by numerals 1 designates the wheel barrow supporting frame which comprises a pair of parallel members having their front ends connected by means of a transversely extending beam 2. The rear ends of the horizontal beams are so shaped as to form convenient handles for facilitating the operation of the wheel barrow. A fender 3 is carried by the forward end of the frame 1 and comprises a pair of depending angle members 4 which are integrally formed with a strap member 5 which strap member fits upon the bottom of the transversely extending beam 2 for conveniently holding the fender in engagement with the frame 1. A wheel shield 6 is connected at its rear end to the depending angle members 4 and extends outwardly so as to clear the wheel 7, which wheel is supported between the depending members 4. A central brace member 8 is connected to the transversely extending beam 2 and engages also the fender member 6 near its center so as to brace the same and hold the fender out of engagement with the wheel 7. The frame 3 is braced against rearward strain by means of diagonally extending braces 9 which braces have their upper ends connected to the frame 1 by means of bolts 10.

A substantially V-shaped supporting brace 11 is carried near each of the handles of the frame 1 and these supporting braces are in turn braced by means of a substantially inverted U-shaped brace 12 which extends transversely of the frame 1. A second transversely extending brace beam 13 is carried by the frame 1 between the longitudinally extending members of the frame so as to brace the longitudinally extending members near the handle of the frame 1 and also act as a rest for the rear end of the body of the wheel barrow.

The body 14 of the wheel barrow comprises a substantially rectangular structure having a closed rear end 15 and an opened front end. The front end of the wheel barrow is normally closed by means of a hinged chute 16 which chute is provided with a pair of side walls 17. The side walls of the wheel barrow are each provided with a pocket 18 in which fit the side walls 17 of the chute 16. This pocket 18 is formed by means of a plate 19 which is spaced from the side walls of the body of the wheel barrow along a portion of its length having its rear edge bent to form a flange 20, which flange is firmly riveted or otherwise secured to the body of the wheel barrow. It will therefore be obvious that this pocket 18 will form an efficient guide for the side walls 17 of the chute 16 while the same is being swung to closed or dumped position.

The dumping chute 16 is hingedly secured to the body of the wheel barrow by means of a hinge 21 and it will therefore be seen that the chute 16 may be easily and quickly swung to a closed or dumped position through the medium of the operating means hereinafter described.

A dump controlling lever 22 is pivotally secured to the body of the wheel barrow as at 23 and has its angled end 24 connected to a link 25 which link in turn is connected to a bracket 26 carried by the chute 16. This dump controlling lever 22 works in a guide 27 which guide is fixedly secured to the body of the wheel barrow 14 and the inner end of the dump-controlling lever 22 is offset as at 28 for forming an efficient handle. One of the said walls of the dump chute 16 is provided with an arc slot 29 in which works a pin 30 which pin is carried by the plate 19. It will therefore be obvious that this pin working in the slot 29 will form efficient means for limiting the swinging movement of the chute 16 upon the body 14 of the wheel barrow. The opposite wall of the chute 16 is provided with an arc slot 31 which slot is provided with a ratchet upper edge 32. A locking lever 33 is pivotally secured to the body 14 of the wheel barrow as at 34 and this locking lever is provided with an offset or angled end 35 which angled end is adapted to fit in one of the notches formed upon the upper face of the arc slot 31. The angled end 35 extends through an aperture 36 formed in the plate 19 which covers the slot 31. The angled end 35 of the locking lever 33 is provided with an inwardly extending lip 37 which lip tends to hold the locking lever against lateral movement relative to the body 14. The locking lever 33 works in a guide 38 carried by the body 14 and the lever 33, like the lever 22, is provided with an offset end 39 for constituting an operating handle therefor.

It will be obvious that through the medium of the locking lever and ratchet slot 31, as formed in the chute 16, the chute 16 may be locked in an adjusted position, by merely swinging the lever 33 into engagement with one of the ratchet teeth formed upon the upper wall of the slot 31 as is illustrated in Fig. 3 of the drawings.

The body 14 of the wheel barrow is hingedly secured to the supporting frame 1 by means of the hinge 40 and the rear end of the body 14 is normally held in engagement with the supporting frame 1 by means of a depending locking lip 41, which locking lip is engaged by the locking lever 42. The depending lip 41 is provided with an angled extension 43 which is adapted, while being locked, to pass through the offset portion 44 formed in the transversely extending section 45 of the locking lever 42. A longitudinally extending portion 46 is integrally connected to the transversely extending portion 45 of the locking lever 42 and this longitudinally extending portion terminates in a coil 47 through which passes a pin which pin acts as a pivot for the locking member 45. The extreme end of the longitudinally extending portion 46 terminates in a handle portion 48 which handle portion is adapted to lie directly under the left handle of the wheel barrow or supporting frame as illustrated in Figs. 2 and 4. By pushing the handle 48 of the locking lever 42 to the right the offset portion 44 will be drawn to the left thereby allowing the laterally extending portion 43 of the depending lip 41 to pass through or between the offset portion 44 and allow the body of the wheel barrow to be dumped. This construction will be readily seen by carefully considering Fig. 4.

From the foregoing description it will be seen and by carefully considering Fig. 2 that when the wheel barrow is to be dumped the dumping lever 22 may be swung to the position as shown in Fig. 2, thereby causing the dumping chute 16 to take the position shown in Fig. 2 and present a straight chute surface for the entire length of the wheel barrow. The chute may be so held in this position or in any other desired tilted position through the medium of the locking lever 33 above described.

There has thus been provided a simple and efficient device of the kind described and for the purpose specified.

It is obvious that many minor changes may be made in the form and construction thereof without departing from the material principles thereof, and it is therefore not wished to confine the invention to the exact form herein shown and described, but it is wished to include all such as properly come within the scope claimed.

It should be understood that as the latch member 42 is moved so as to have the lug 43 engaged by the transversely extending portion 45, as illustrated in Fig. 4, the body of the wheel barrow will be held against dumping. When the bent portion 44 is brought to register with the lug 47, it will be seen that the body may dump forward owing to the fact that there is no support for the rear end of the body.

Having thus described the invention, what is claimed as new, is:—

1. A wheel barrow of the class described comprising a body provided with an open outer end, a chute hinged to said body near said open outer end, said chute provided with an arc slot having ratchet teeth formed upon its upper edge, said body provided with an elongated slot in the path of movement of said arc slot, a locking lever pivotally secured to said body, and extending longitudinally thereof for facilitating the operation of said lever from the rear of said body, said lever provided with a substantially angularly extending outer end terminating in a rearwardly extending foot fitting through said slot formed in said body, said angularly extending end adapted to engage the ratchet teeth formed upon the upper edge of said slot in said chute for holding said chute in an adjusted position, said rearwardly extending foot formed upon said angularly extending end adapted to hold said angularly extending end against lateral displacement from said ratchet teeth formed upon the upper edge of said slot formed in said chute.

2. A wheelbarrow of the class described comprising a body, a chute secured to the forward end of said body, said chute provided with an arc slot having ratchet teeth formed upon its upper edge, an operating lever pivotally secured to said body, means carried by said lever and engaging said ratchet means for preventing the lateral displacement of said lever from said ratchet means.

In testimony whereof I hereunto affix my signature in presence of two witnesses.

DAVID H. BRAND.

Witnesses:
  THOMAS B. MADDEN,
  FRED A. DOUGLASS.

Copies of this patent may be obtained for five cents each, by addressing the "Commissioner of Patents, Washington, D. C."